United States Patent [19]

Pinchbeck et al.

[11] Patent Number: 4,944,563
[45] Date of Patent: Jul. 31, 1990

[54] WHEEL ASSEMBLY INCLUDING A SOLID TIRE

[75] Inventors: Colin Pinchbeck, Kirkland; Thomas H. Shorey, Mill Creek, both of Wash.

[73] Assignee: The Boeing Company, Seattle, Wash.

[21] Appl. No.: 331,903

[22] Filed: Mar. 30, 1989

[51] Int. Cl.⁵ .................................................. B60C 7/00
[52] U.S. Cl. .................................... 301/63 DS; 301/97; 152/323
[58] Field of Search ............... 152/323, 7, 324, 325, 152/326, 327, 328, 379.3, 379.4, 379.5; 301/5 R, 62, 63 R, 63 PW, 63 DD, 63 DS, 64 SH, 95, 96, 97, 98

[56] References Cited

U.S. PATENT DOCUMENTS

| | | | |
|---|---|---|---|
| 807,350 | 12/1905 | Beasley . | |
| 936,008 | 10/1909 | Mérigoux . | |
| 2,713,373 | 7/1955 | Daugherty | 152/384 |
| 2,854,052 | 9/1958 | Smith et al. | 152/378 |
| 2,887,203 | 5/1959 | Baron | 193/37 |
| 3,114,408 | 12/1963 | Ross | 152/323 |
| 3,565,490 | 2/1971 | Statz | 301/63 DD |
| 3,753,541 | 8/1973 | Grueber et al. | 244/137 R |
| 3,815,959 | 6/1974 | Hill | 301/63 PW |
| 3,888,545 | 6/1975 | Braun | 301/63 PW |
| 3,895,844 | 7/1975 | Merbler | 301/5.7 |
| 3,899,070 | 8/1975 | Lang | 198/127 R |
| 3,988,045 | 10/1976 | Coutant | 308/20 |
| 4,006,810 | 2/1977 | Kornylak | 193/37 |
| 4,168,771 | 9/1979 | Krivec | 193/35 A |
| 4,305,444 | 12/1981 | Suris | 152/325 X |
| 4,345,633 | 8/1982 | Gilmore | 152/328 |
| 4,445,257 | 5/1984 | Delhaes | 29/117 |
| 4,549,592 | 10/1985 | Schröder | 152/328 |
| 4,561,481 | 12/1985 | Kawauchi et al. | 301/97 X |

FOREIGN PATENT DOCUMENTS

512271 8/1939 United Kingdom ........... 301/63 DS

Primary Examiner—Russell D. Stormer
Attorney, Agent, or Firm—Christensen, O'Connor, Johnson & Kindness

[57] ABSTRACT

A wheel assembly incorporating a solid tire having a controlled deflection under load. A wheel assembly (20,200) includes a solid tire (22,202) mounted on a rim (24,204). The rim includes a plurality of axial grooves (68), radial grooves (60), or "U" shaped slots (216), which engage the sides and inner circumferential surface of the solid tire to prevent its slipping around the rim when applying a tractional force. In addition, the outer circumference of the rim includes ridges (50) or radial projections (224) between which are disposed depressions into which the solid tire may deform when subjected to a radial load. The volume provided in the depressions around the outer circumference of the rim and the shore hardness of the composition from which the solid tire is made determine the extent of radial deflection of the solid tire as a function of load so that it is within a required range.

20 Claims, 7 Drawing Sheets

WHEEL ASSEMBLY INCLUDING A SOLID TIRE

FIELD OF THE INVENTION

This invention generally pertains to wheel assemblies, and specifically to wheels that include a non-pneumatic solid tire.

BACKGROUND OF THE INVENTION

Baggage or freight carried on commercial aircraft is often loaded into standardized pallets and containers that are sized to fit efficiently within either a lower lobe or main cargo bay of the aircraft. The pallets or containers are separately filled with the cargo, transported to the aircraft, and loaded onto a handling system that is built into the cargo bay floor. In the conventional cargo handling system, rotatably driven pneumatic tires are mounted under the floor, protruding above the floor a predefined distance to control traction applied to the bottom of the pallets or containers to move them into position within the cargo bay.

The pneumatic tires presently used in cargo handling systems are subject to a number of problems that tend to degrade the operating efficacy of the system. For example, as an aircraft climbs to high altitude, the drop in ambient air pressure increases air loss from the tires due to leakage, causing the inflation pressure of the tires to drop below a recommended level when the aircraft returns to ground. The loss of air pressure in the pneumatic tire reduces the maximum traction or thrust that the tire can apply to move a container, because as the tire inflation pressure drops, the weight of the load is transferred from the tires onto adjacent hard rollers. The tops of the hard rollers define a roller plane that is a few tenths of an inch below the tops of the unloaded pneumatic tires; an underinflated pneumatic tire can allow a heavy container to settle onto the hard rollers since the weight of the load too easily compresses the tire. In addition, underinflated pneumatic tires are more susceptible to damage from impacts with the edges of pallets and containers. Such damage is likely to rupture the tire or puncture it, causing it to go flat. Proper maintenance of the cargo handling system requires frequent checks of the tire inflation, and all too often may involve replacement of flat tires in the system.

Maintenance personnel sometimes attempt to compensate for the expected air loss in pneumatic tires by initially overinflating them. While the higher-than-recommended inflation pressure may provide a short-term solution to this problem for relatively heavier loads, lightweight containers do not cause sufficient vertical deflection of the overinflated tire. Consequently, lightweight containers may ride so high above the roller plane that a flange provided around the base of each container fails to engage hold down clamps that are used to lock the containers in place.

The requirement for servicing and replacing pneumatic tires in cargo handling systems is recognized as a significant cause of aircraft out-of-service time. Commercial carriers have long complained that pneumatic tires are too susceptible to variations in thrust and vertical deflection as a result of changes in inflation pressure, and are not rugged enough to withstand the abrasion and impact forces developed in the aircraft cargo handling system. While it may appear that a wheel assembly using a solid tire would be a likely replacement to overcome these problems, conventional solid tire wheel assemblies have been found incapable of controlling vertical deflection within an acceptable range for the different loads encountered in a cargo handling system—such tires have either deflected too much under heavy loads or not enough under light loads. Furthermore, in conventional wheel assemblies of this type, it was found virtually impossible to adhesively attach a solid tire to a rim so that it would not eventually come free of the rim and slip when applying thrust to a container. The present invention was developed to address these problems.

SUMMARY OF THE INVENTION

In accordance with the present invention, a wheel assembly having resistance to the effects of abrasion and capable of providing a controlled radial deflection under load comprises a solid tire and a rim. The solid tire is made from an abrasion-resistant, resilient rubber composition having a predefined range of shore A hardness, and a generally semicircular cross section. The rim includes means for mounting the tire on a circumferential surface of the rim. A pair of lips are formed around peripheral edges of the rim, extending radially beyond the circumferential surface. Facing sides of the lips abut against opposite sides of the solid tire, gripping it firmly when it is mounted on the rim to prevent it from slipping under a tractional load.

The rim also includes a plurality of spaced apart depressions formed around the circumferential surface, between the pair of lips, into which the solid tire deflects under a radial load. The volume of each depression and the shore A hardness of the resilient rubber composition together control the extent of radial deflection of the solid tire so that it is within predefined limits.

The means for mounting the solid tire on the rim preferably comprise means for splitting the rim into at least two parts and securing the solid tire between the parts when they are assembled. Further, the internal diameter of the solid tire is less than the diameter of the circumferential surface of the rim so that the solid tire must be elastically stretched to mount it on the rim during the assembly.

Included in the rim is an internally splined hub through which tractional force is transmitted to the solid tire. The wheel assembly is thus adapted to mount on a rotatably driven splined shaft to apply traction to a load riding on an outer circumferential surface of the solid tire.

The circumferential surface of the rim may preferably include a pair of shoulders formed on each side of the plurality of depressions. A plurality of spaced apart ridges are formed around each of the shoulders to grip the solid tire when it is mounted on the rim, minimizing slippage between the rim and the solid tire.

In one preferred form, the solid tire includes a plurality of cords embedded within it, running circumferentially around the solid tire, generally adjacent to its sides and inner radial surface. The cords maintain hoop tension on the solid tire, preventing it from lifting off the rim when it is subjected to a lateral force.

DESCRIPTION OF THE PREFERRED EMBODIMENTS

FIGS. 1-4 illustrate various aspects of a first preferred embodiment of the present invention, in respect to a wheel assembly 20. Wheel assembly 20 includes a solid tire 22, preferably made from a rubber composition having a shore A hardness within a predefined range (60-70 in the preferred design). Other types of suitable abrasion-resistant resilient compositions may also be used for this purpose. The shore A hardness of the material comprising solid tire 22 may be controlled by varying the composition, as is well known to those of ordinary skill in this art.

Figure 1:
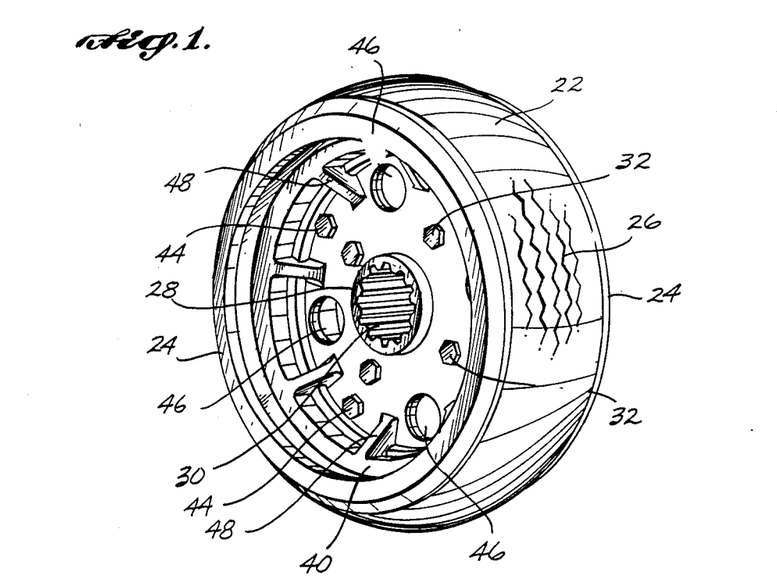
FIG. 1 is an isometric view of a first preferred embodiment of a wheel assembly, in accordance with the present invention.

Solid tire 22 has a generally semicircular cross section and is mounted on a rim 24 so that its convex outer surface extends outwardly of the rim. The outer surface may optionally include a tread pattern 26, only a portion of which is shown in FIG. 1. Tread pattern 26 increases the friction between the outer surface of solid tire 22 and any other surface against which it abuts, particularly when the surfaces are wet; however, the tread pattern also increases the risk that a corner of an object being slid laterally across the solid tire may hang up and not slide freely. In certain applications, it is thus preferable to omit tread pattern 26.

Rim 24 includes a hub 28 having a center opening provided with splines 30. In the application of wheel assembly 20 to a cargo handling system, for use in moving containers as described below, splines 30 are required to apply a tractional driving force to the tire. In other application, hub 28 might instead include a bearing, permitting wheel assembly 20 to rotate freely on a shaft.

Figure 2:
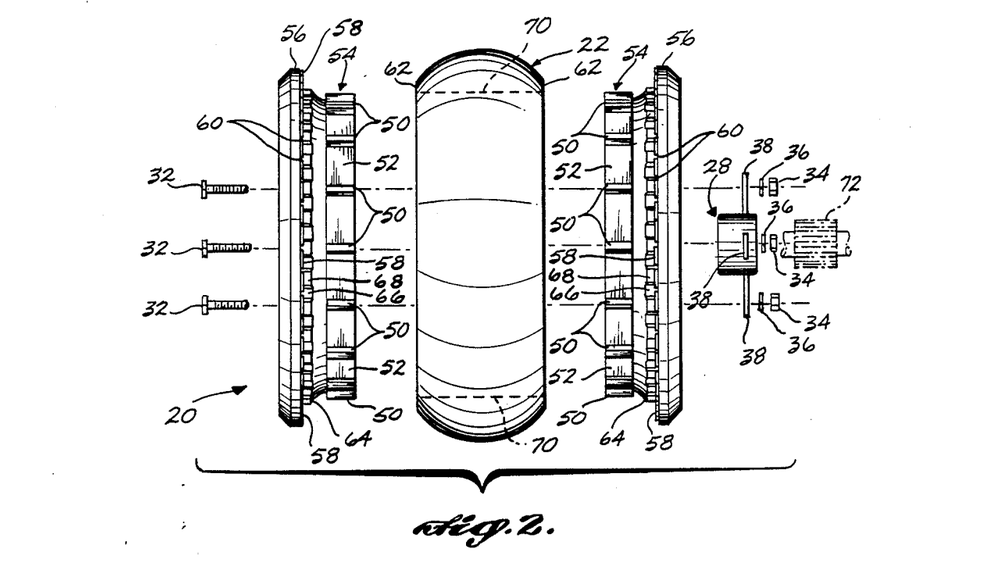
FIG. 2 is an exploded, elevational view of the wheel assembly of FIG. 1.

The exploded view of wheel assembly 20 shown in FIG. 2 clearly illustrates how rim 24 is split into two parts along its axial center line. With respect to this figure, rim 24 includes a left half 40 and a right half 42, which are joined together by bolts 32 and 44, nuts 34, and lock washers 36, after solid tire 22 is mounted thereon. The internal diameter of solid tire 22 is preferably 2-5% less than the diameter of the surface of rim 24 on which the solid tire is mounted, requiring that solid tire 22 be stretched to seat it on both left half 40 and right half 42 of rim 24. Use of an undersized solid tire helps to reduce slippage between solid tire 22 and rim 24.

Bolts 32 and nuts 34 also are used to mount hub 28 in place, the bolts passing through holes formed in four tabs 38, which extend radially from the hub. A plurality of cut outs 46, disposed at spaced apart intervals around the center portion of rim 24, serve to reduce the overall weight of wheel assembly 20. The strength and rigidity of rim 24 are improved by the use of a plurality of webbing sections 48, which extend between the outer circumferential portion of the rim and its radial portion. Rim 24 is preferably made from cast aluminum or lightweight metal alloy.

A circumferential surface 54 of rim 24 includes a plurality of spaced apart ridges 50 that are aligned generally with the axis of the wheel assembly; adjacent pairs of the ridges define the sides of each of a plurality of depressions 52. Ridges 50 and depressions 52 are disposed between radially extending lips 56 that are formed around the edges of rim 24. Lips 56 each include a plurality of spaced apart radial ridges 58, between which are disposed radial grooves 60. Radial ridges 58 and radial grooves 60 abut against sides 62 of solid tire 22 when rim 24 is assembled with the solid tire mounted thereon and are operative to grip sides 62 to prevent the solid tire from slipping around rim 24 when it applies a tractional force to a load. Rim 24 also includes a pair of shoulders 64, each of which is disposed between depression 52 and one of lips 56. To further enhance the friction between an inner circumference 70 of solid tire 22 and circumferential surface 54 of rim 24, a plurality of axial ridges 66 are formed on shoulders 64 in abutting contact with inner circumference 70. Since solid tire 22 must be stretched slightly to mount it on rim 24, the solid tire seats within axial grooves 68, virtually eliminating any possibility that it might slip on rim 24 when applying tractional force to a load. A drive shaft 72 adapted to engage splines 30 is shown in phantom view in FIG. 2 to illustrate how wheel assembly 20 is rotatably driven.

Figure 3:
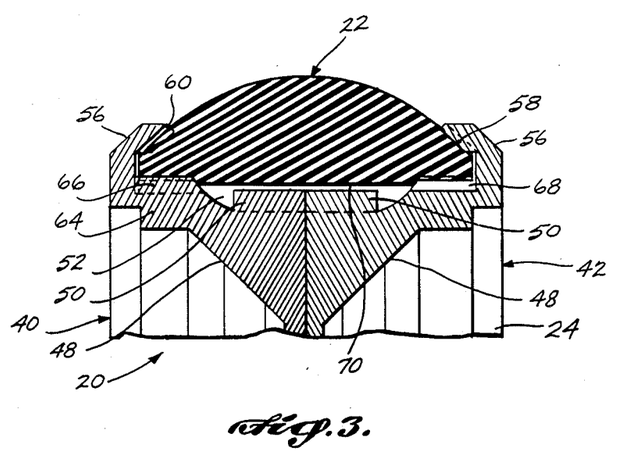
FIG. 3 is a cross-sectional view of a portion of the wheel assembly of FIG. 2, illustrating the disposition of a solid tire before a vertical load is applied.
Figure 4:
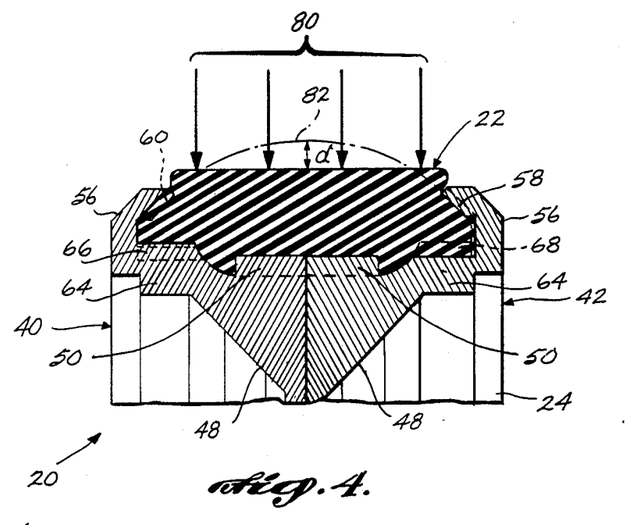
FIG. 4 is a cross-sectional view of a portion of the wheel assembly of FIG. 2, illustrating the controlled deflection of the solid tire when subjected to a vertical load.

FIGS. 3 and 4 illustrate the manner in which solid tire 22 is gripped within radial grooves 60 and axial grooves 68. In FIG. 3, solid tire 22 is shown prior to application of a vertical load to its outer surface. In this unloaded condition, inner circumference 70 of solid tire 22 extends across depressions 52, clearing the upper surface of ridges 50. In addition, when unloaded, solid tire 22 only partially fills axial grooves 68 and radial grooves 60. However, when a vertical (or radial) force is applied to the outer circumference of solid tire 22, as illustrated by arrows 80 in FIG. 4, solid tire 22 deflects into depressions 52 and more fully fills radial grooves 60 and axial grooves 68 in the area where the load is applied.

The volume of depressions 52 and the shore A hardness of the rubber composition comprising solid tire 22 control the extent that solid tire 22 deflects as a function of the magnitude of the applied vertical force, which is illustrated using arrows 80. For a maximum rated vertical force, solid tire 22 deflects radially a distance, d. This distance represents the change in radius of solid tire 22 measured with respect to the undeflected outline of solid tire 22, indicated in FIG. 3 with a dot-dash line 82. By selecting an appropriate shore A hardness for the material comprising solid tire 22 and providing depressions 52 of a predetermined volume, the deflection of solid tire 22 as a function of vertical (or radial) force is controlled within desired limits. The shore A hardness of this material and the volume of depressions 52 are particularly important to control deflection of solid tire 22 under lightweight loads.

The controlled deflection of solid tire 22 under load is particularly relevant to the intended use of wheel assembly 20 in a cargo handling system on an aircraft. A portion of such a cargo handling system is indicated at reference numeral 100 in FIG. 5. Wheel assembly 20 is used in cargo handling system 100 to move a container 102 into position within an aircraft cargo bay 104. Container 102 includes a flange 106 around the periphery of its base. A plurality of hold down clamps 108, 110, and 112 are provided to engage flange 106, preventing container 102 from shifting in flight. Wheel assembly 20 applies a tractional driving force to move container 102 into position so that hold down clamps 108, 110, and 112 can engage flange 106. At all times, the bottom of cargo container 102 rests on the outer circumference of at least one solid tire 22, although only one wheel assembly 20 is shown in the figure. Wheel assembly 20 is mounted so that the upper surface of solid tire 22 extends above a reference plane defined by the tops of rollers 114. Rollers 114 are mounted at spaced apart intervals across and along the length of cargo bay 104 and carry any weight of the containers loaded therein that is not carried by the solid tire(s) 22.

Figure 5:
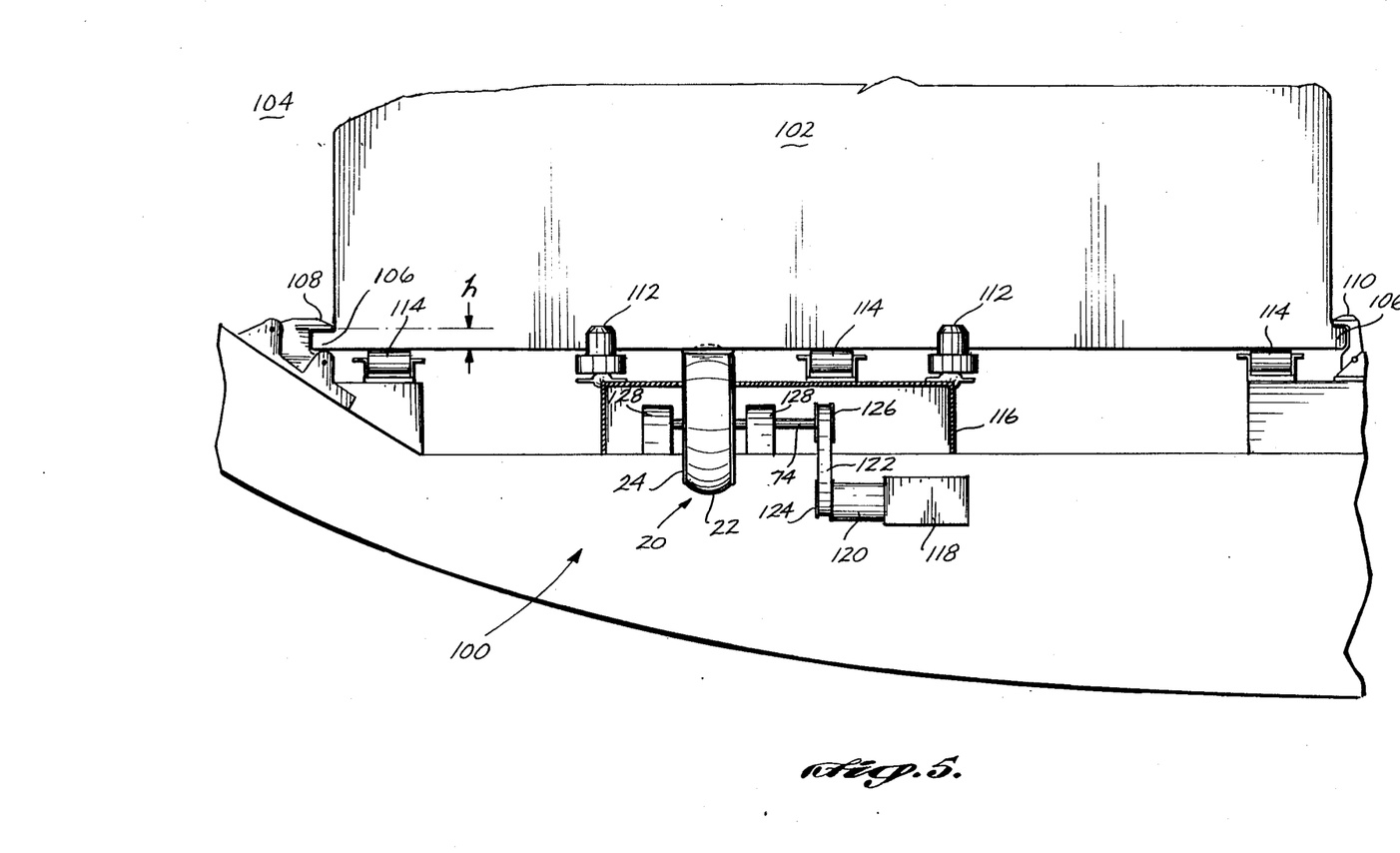
FIG. 5 is a schematic, elevational view of part of an aircraft cargo bay, showing application of the present invention to a cargo handling system.

Wheel assembly 20 is disposed within a support 116. Solid tire 22 extends through an opening formed in an upper surface of support 116. A motor 118 disposed within support 116 has its rotating shaft (not separately shown) connected to a transmission 120. Transmission 120 is operative to reduce the speed and increase the power transmitted from motor 118 to wheel assembly 20. A belt 122 runs on a sheave 124 affixed to an output shaft (not shown) of transmission 120, and on a sheave 124 that is mounted on drive shaft 72. Drive shaft 72 drivingly engages splines 30 in hub 28 of wheel assembly 20 and is supported on each side of the wheel assembly by bearing blocks 128.

Controlled deflection of solid tire 22 is critical to the proper operation of aircraft cargo handling system 100 because of the design clearance between the roller plane defined by rollers 114 and the lower surface of hold down clamps 108, 110, and 112. This design clearance height is indicated in FIG. 5 by "h". If solid tire 22 is either mounted too high or fails to deflect sufficiently under the radial load applied by a lightweight container 102, the upper surface of flange 106 may fail to clear the lower surface of one or more of the hold down clamps, in particular hold down clamps 112, which are closest to wheel assembly 20. As a result, it may be difficult or impossible for all of the hold down clamps to fully engage flange 106, thus preventing the container from being properly secured within the aircraft. On the other hand, excessive deflection of solid tire 22 under the weight of a relatively heavy container 102 could allow too much of the weight of the container to ride on rollers 114, preventing wheel assembly 20 from exerting sufficient thrust to drive the container into position. Thus, it is critically important to control the deflection of solid tire 22, with respect to the vertical load imposed by containers or pallets, for its use in aircraft cargo handling system 100.

A compression set value is experimentally determined for the rubber composition used in solid tire 22, and in the preferred embodiment, is about 35%. The compression set value defines the limit of compression to which the rubber composition comprising the solid tire may be subjected by a load for an extended period of time without changing the shape of the solid tire once the load is removed. The height at which wheel assembly 20 is mounted above the roller plane controls the maximum allowed deflection of solid tire 22 and is selected so that its compression set value is not exceeded.

Figure 10:
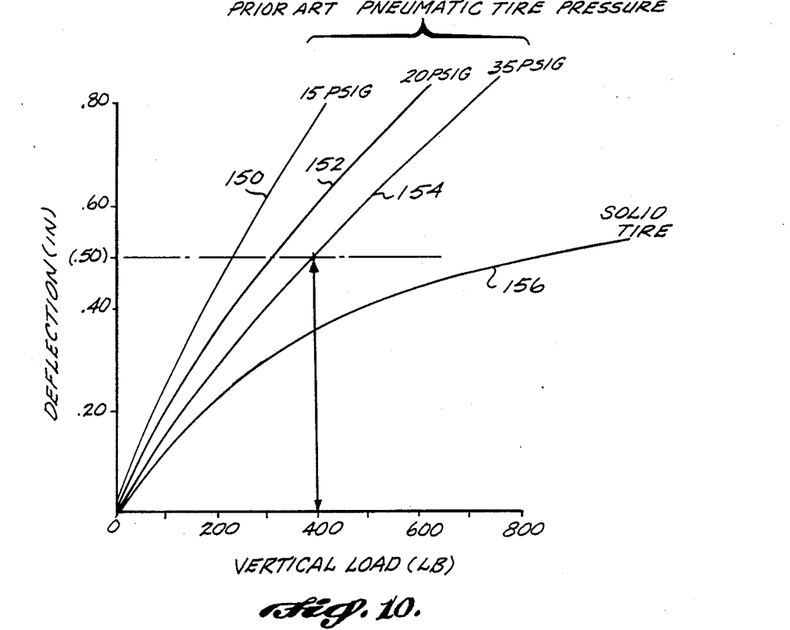
FIG. 10 is a graph showing vertical deflection versus load for a solid tire, and for a prior art pneumatic tire at three different inflation pressures.
Figure 11:
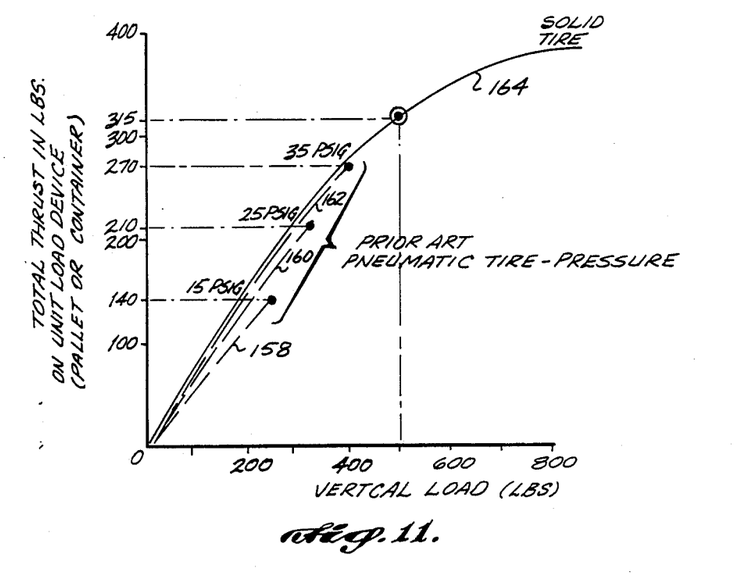
FIG. 11 is a graph showing total thrust delivered to a unit load device as a function of vertical load for a solid tire, and for a prior art pneumatic tire at three different inflation pressures.

Referring now to FIGS. 10 and 11, characteristics of the solid tire as used in wheel assembly 20 are shown in comparison to a prior art pneumatic tire typical of those currently used in aircraft cargo handling system 100. In FIG. 10, the deflection of a prior art pneumatic tire at inflation pressures of 15 psig, 20 psig, and 35 psig are shown respectively by curves 150, 152, and 154, as a function of the vertical load applied to the tire. Similarly, the deflection of solid tire 22 as a function of vertical load is represented by a curve 156. The recommended mounting height of the upper surface of the prior pneumatic tires above the reference plane and their maximum deflection is 0.50 inches. The recommended inflation pressure for the prior art pneumatic tire is 35 psig; thus, curve 154 indicates that for the maximum deflection, a vertical load of 400 pounds can be carried by the prior art pneumatic tire inflat inflated to its recommended pressure. As explained above, the prior art pneumatic tire generally does not maintain the recommended inflation pressure in use; typically, its inflation pressure is more likely to be about 15–20 psig, as represented by curves 150 and 152. The maximum vertical load that the prior art pneumatic tire can carry for an inflation pressure within this range is only about 230–330 pounds. By comparison, the recommended mounting height, h, for solid tire 22 is 0.40 inches, enabling it to carry a vertical load of almost 500 pounds. Furthermore, the controlled deflection of solid tire 22 into depressions 52 caused by a lightweight vertical load is sufficient to enable cargo hold down clamps 108, 110, and 112 to engage flange 106.

In FIG. 11, curves 158, 160, and 162 respectively show the total thrust delivered by the prior art pneumatic tire at inflation pressures of 15 psig, 25 psig, and 35 psig, respectively. A curve 164 shows the relationship between total thrust delivered by solid tire 22 to a pallet or container, as a function of vertical load. As shown in FIG. 11, the maximum thrust delivered to a pallet or container decreases from about 270 pounds to about 140 pounds if the inflation pressure of the prior art pneumatic tire drops from the recommended 35 psig to 15 psig. If the solid tire is mounted at its recommended height, it can deliver up to 315 pounds of thrust to a vertical load of 500 pounds. More importantly, the performance of solid tire 22 remains relatively constant, because its deflection and thrust capability cannot change as a result of air leakage.

Figure 12:
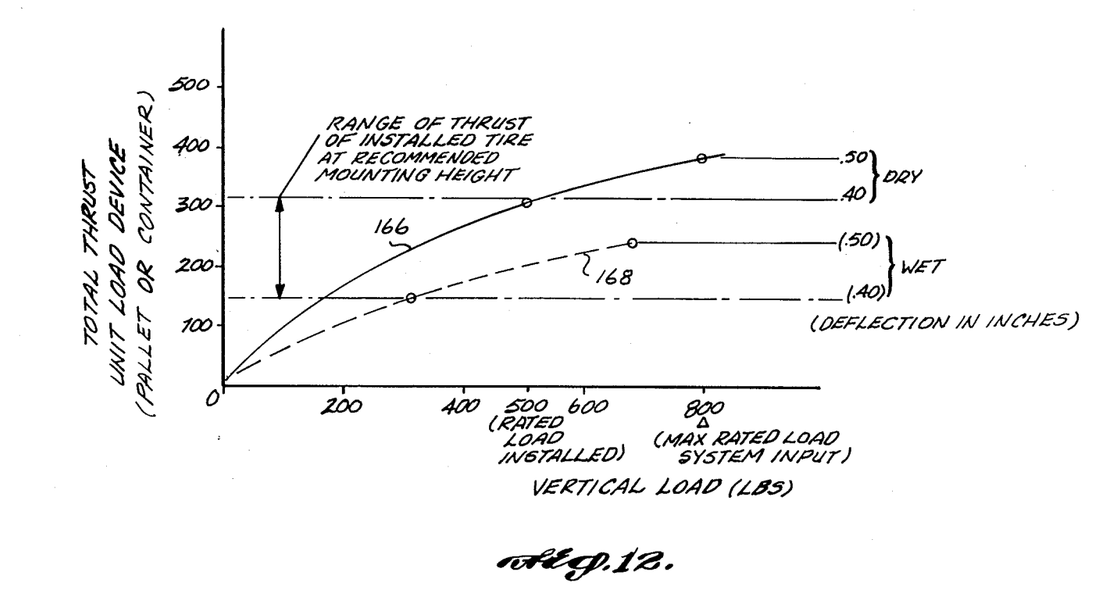
FIG. 12 is graph showing range of thrust delivered by a solid tire (wet and dry conditions) as a function of vertical load.

Turning now to FIG. 12, the total thrust delivered by solid tire 22 to a unit load device such as a pallet or container is plotted as a function of the vertical load on the solid tire for two different mounting heights, 0.50 inches and 0.40 inches, and for both wet and dry conditions. It should be noted that although the recommended mounting height, h, of solid tire 22 above the roller reference plane is 0.40 inches, wheel assembly 20 may be mounted so that the top of solid tire 22 is 0.50 inches above the roller reference plane if it is necessary to carry greater vertical loads. The maximum rated load for each wheel assembly in aircraft cargo handling system is 800 pounds. When dry solid tire 22 can exert almost 400 pounds of thrust to move and 800 pound container into or out of storage position. At the recommended mounting height, 0.40 inches, when wet, solid tire 22 can exert approximately 150 pounds of thrust on a vertical load of about 360 pounds, and when dry, up to 315 pounds thrust on a maximum rated 500 pound load. As shown in the test results displayed in FIGS. 10, 11, and 12, solid tire 22 performs better than the prior art pneumatic tire, and in all respects, exceeds the requirements for use in aircraft cargo handling system 100.

A second embodiment of a wheel assembly 200 is shown in FIGS. 6, 7, 8, and 9; it is intended for use in a cargo handling system where the wheel assembly is subjected to greater loads than in the preceding example. Wheel assembly 200 includes a solid tire 202 that is mounted on a stamped steel rim 204, having a hub 206. The center of hub 206 may optionally include splines 208 to rotatably drive the wheel assembly, or a bearing (not shown). Steel rim 204 includes shoulders 212, formed on its circumferential surface, and two radially extending lip rings 210 and 214 disposed on opposite sides of the shoulders. Lip ring 210 is tack welded or affixed by other suitable means to steel rim 204, while lip ring 214 is initially detached from steel rim 204 to enable solid tire 202 to be mounted in place on the rim. Solid tire 202 has an internal diameter, which is slightly (preferably 2-5%) less than the outer diameter of shoulders 212, on which an inner circumference 230 of solid tire 202 rests when mounted. Accordingly, solid tire 202 must be stretched to fit over shoulders 212 when mounted upon steel rim 204. The undersized dimension of solid tire 202 helps to insure that it does not slip around steel rim 204. After solid tire 202 is seated in place on the steel rim, lip ring 214 is slid between the inner circumference of solid tire 202 and one of the shoulders 212; lip ring 214 is then rotated to engage a plurality of keyed slots 222, formed on lip ring 214, with flathead pins 220. Pins 220 extend radially outward from the shoulder 212 on which lip ring 214 is mounted. Thereafter, lip ring 214 is secured in place on steel rim 204 by tack welding from the hub side through slots (not shown) formed at spaced apart intervals around shoulder 212.

Figure 6:
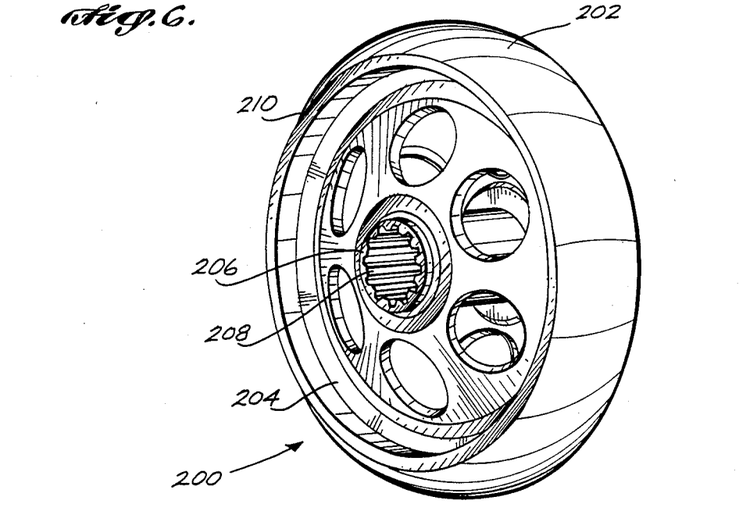
FIG. 6 is an isometric view of a second preferred embodiment of a wheel assembly in accordance with the present invention.
Figure 7:
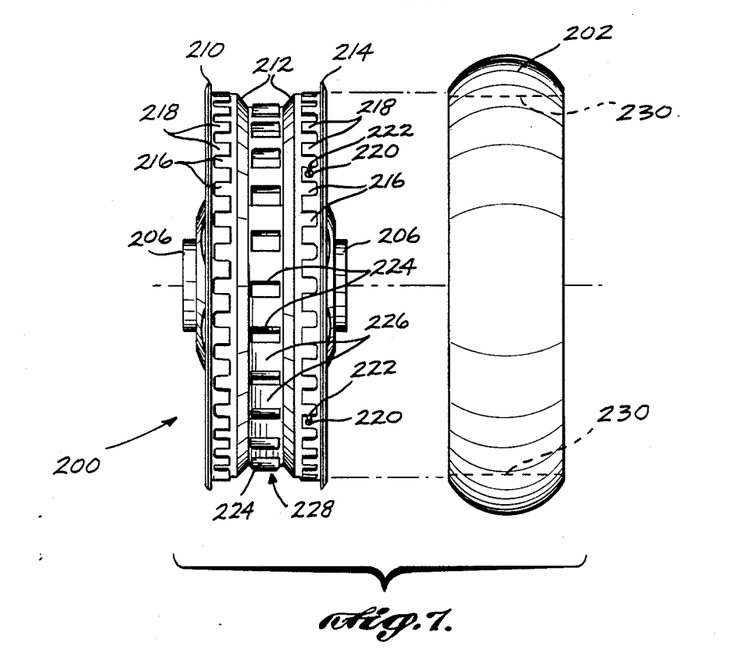
FIG. 7 is an elevational, exploded view of the embodiment of FIG. 6.

Each of lip rings 210 and 214 include a plurality of spaced apart tabs 218 defined on their inwardly extending edges. Between tabs 218 are disposed a corresponding number of "U" shaped slots 216. Slots 216 engage the inner surface of solid tire 202, providing an enhanced frictional gripping force that prevents the solid tire from slipping about steel rim 204. In addition, when lip ring 214 is mounted in place on shoulder 212, the sides of solid tire 202 are compressed between the facing surfaces of lip rings 210 and 214; the lip rings thus compressively engage solid tire 202, further assisting in preventing it from slipping as thrust is applied to a load by wheel assembly 200.

Disposed between shoulders 212 in a recessed portion of the circumference of steel rim 204 are a plurality of radial projections 224. Radial projections 224 are stamped out of the steel rim when it is manufactured. Adjacent pairs of the radial projections and shoulders 212 define a depressed area 226, which can be used to control the deflection of solid tire 202 under a vertical (or radial) load. The extent of the deflection of solid tire 202 into the depressed area 226 under the load is controlled not only by the size of the depressed area and the height of radial projections 224, but also by the shore A hardness of the rubber composition from which solid tire 202 is preferably made. In the preferred embodiment of wheel assembly 200, the shore A hardness of this composition is from 60-70.

Figure 8:
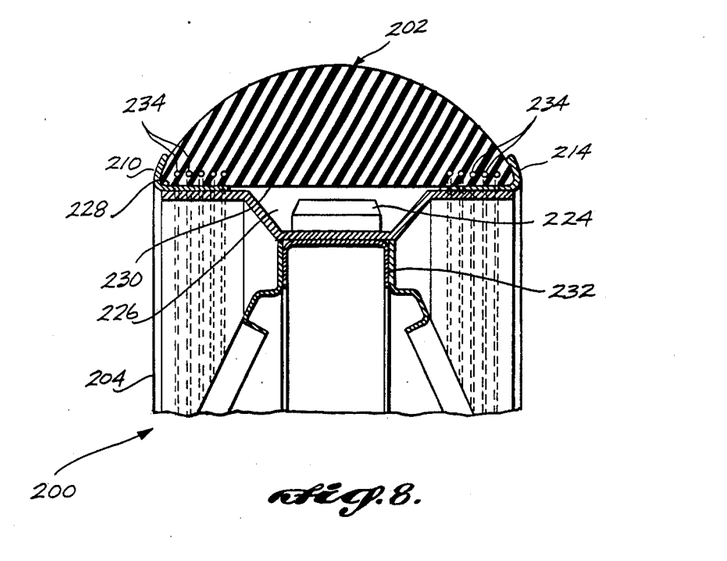
FIG. 8 is a cross-sectional view of part of the wheel assembly of FIG. 7, illustrating the disposition of the solid tire when not vertically loaded.
Figure 9:
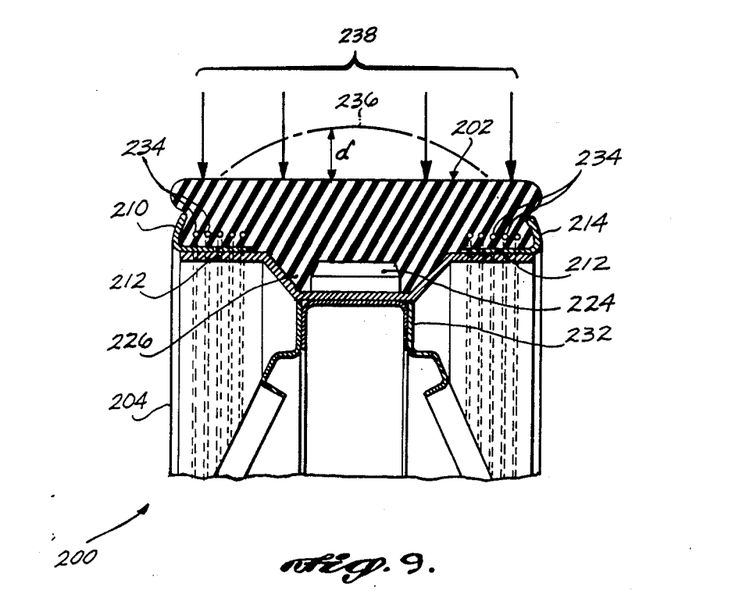
FIG. 9 is a cross-sectional view of part of the wheel assembly of FIG. 7, illustrating the controlled deflection of the solid tire under a vertical load.

FIG. 8 shows the conformation of solid tire 202 prior to the application of a vertical load. In FIG. 9, a vertical force is applied to solid tire 202, as indicated by arrows 238. The vertical force causes the solid tire to deflect a distance, d, (with respect to its undeflected outline, illustrated by a dot-dash line 236). As solid tire 202 deflects under the vertical force, it deforms into depressed areas 226 so that its deflection is controlled as a function of the applied force within a predefined range. Radial projections 224 also engage the internal surface of solid tire 202, further increasing the friction between the solid tire and steel rim 204 to prevent the solid tire from slipping around the rim as tractional force is applied to a load.

Wheel assembly 200 is intended for use in a cargo handling system wherein solid tire 202 is likely to experience a lateral force, i.e., a force caused by a container sliding across the solid tire from the side. Such a force tends to cause solid tire 202 to roll off steel rim 204, and might ultimately demount the solid tire from steel rim 204. To better withstand the effect of lateral force, a plurality of spaced apart cords 234 are embedded within solid tire 202 when it is manufactured; these cords are disposed proximate the inner circumference 230 of the solid tire, at each side. Cords 234 may comprise steel wire, Kevlar TM aramid fibers, Rayon TM, Nylon TM, or other material having similarly high tensile strength. The purpose of cords 234 is to maintain the sides of solid tire 202 under hoop tension, preventing the solid tire from rolling off steel rim 204 when subjected to lateral force. As a result, sideway impacts with the edges of containers or pallets are not likely to cause the solid tire to demount from the steel rim. When mounted on the rim, solid tire 202 is stretched and the portion of the solid tire disposed radially under cords 234 is compressed; however, the compression of this portion of the solid tire due to loading by cords 234 does not exceed the compression set value of the rubber composition of which it is comprised.

Since the rubber composition comprising solid tire 202 resists abrasion, it is not easily damaged by contact with the sharp edges of pallets or containers. Wheel assembly 200 is thus well suited for use in a cargo handling system. Although comparative test results are not shown, wheel assembly 200 offers the same advantages as wheel assembly 20 with respect to thrust vs. load and deflection vs. load characteristics, compared to a prior art pneumatic tire presently used in the cargo handling system.

While the present invention has been shown with respect to its preferred embodiments and modifications thereto, further modifications will be apparent to those of ordinary skill in the art within the scope of the claims that follow herein below. Accordingly, it is not intended that the scope of the invention be in any way limited by the disclosure, but instead that it be determined entirely by reference to the claims.

The embodiments of the invention in which an exclusive property or privilege is claimed are defined as follows:

1. A wheel assembly having resistance to the effects of abrasion and capable of providing a controlled radial deflection under load, comprising:

a solid tire comprising an abrasion resistant, resilient rubber composition having a predefined range of shore hardness, said solid tire having a generally semicircular cross section;

a rim on which the solid tire is mounted, said rim including means for mounting the tire on a circumferential surface of the rim and a pair of lips formed around peripheral edges of the rim, extending radially beyond said circumferential surface, facing sides of the lips abutting against opposite sides of the solid tire and gripping it firmly when it is mounted on the rim to prevent it slipping about the rim under a tractional load; said rim further including a plurality of spaced apart depressions formed around said circumferential surface, between said pair of lips, into which the solid tire is deflected under radial load, the volume of each depression and the shore hardness of the resilient rubber compostion together controlling the extent of radial deflection of the solid tire under load, so that the radial deflection is within predefined limits.

2. The wheel assembly of claim 1, wherein the rim comprises at least two parts and wherein the means for mounting comprise means for joining said at least two parts and securing the solid tire between the parts when they are assembled.

3. The wheel assembly of claim 2, wherein the internal diameter of the solid tire is less than the diameter of said circumferential surface of the rim, so that the solid tire must be elastically stretched to mount it on the rim when it is assembled.

4. The wheel assembly of claim 1, wherein the rim further comprises an internally splined hub through which tractional force is transmitted to the solid tire, said wheel assembly being thus adapted to mount on a rotatably-driven splined shaft to apply traction to a load that rides on an outer circumferential surface of the solid tire.

5. The wheel assembly of claim 1, wherein the rim further comprises a pair of shoulders formed on its circumferential surface, on each side of the plurality of depressions, and a plurality of spaced apart ridges formed around each of the shoulders, said ridges on the shoulders gripping the solid tire when it is mounted on the rim to further minimize slippage between the rim and the solid tire.

6. The wheel assembly of claim 1, wherein the solid tire includes a plurality of cords embedded within it, said cords running circumferentially around the solid tire and being disposed internally, generally adjacent its sides and radially inner surface, and being operative to maintain hoop tension on the solid tire to prevent it from lifting off the rim when it is subjected to a lateral force.

7. A wheel assembly having a controlled range of radial deflection under load and resistance to abrasion, comprising:

a solid tire having a cross-sectional shape defined by an outwardly curving surface adjoining two sides, and a radially inner surface, said solid tire comprising a wear-resistant composition of predefined elasticity and shore hardness; and rim means for mounting the solid tire on an axle, including gripping means for gripping the sides of the solid tire to prevent its circumferential slippage under traction, and means that include a plurality of depressions disposed between the solid tire and rim means, for controlling displacement of the solid tire as it deflects radially under a load so that the radial deflection of the solid tire as a function of the load is within predefined limits.

8. The wheel assembly of claim 7, wherein the rim means comprise a split rim assembly having two portions that are fastened together with the solid tire mounted thereon, each portion of said rim assembly including a peripheral lip disposed immediately adjacent to and abutting against one of the sides of the solid tire.

9. The wheel assembly of claim 8, wherein the gripping means comprise means for increasing friction between the peripheral lips and the solid tire.

10. The wheel assembly of claim 9, wherein the means for increasing friction comprise a plurality of spaced apart grooves formed on a surface of the peripheral lips, said grooves abutting and engaging the sides of the solid tire.

11. The wheel assembly of claim 9, wherein the means for increasing friction comprise a plurality of spaced apart ridges formed on a surface of the peripheral lips, said ridges abutting and engaging the sides of the solid tire.

12. The wheel assembly of claim 7, wherein the rim means include two shoulders that abut the radially inner surface of the solid tire when it is mounted on the rim means, and wherein said gripping means comprise means for enhancing friction between the solid tire and the two shoulders.

13. The wheel assembly of claim 12, wherein the means for enhancing friction comprise a plurality of ridges spaced apart around the shoulders of the rim means.

14. The wheel assembly of claim 12, wherein the means for enhancing friction comprise a plurality of identations spaced apart around the shoulders of the rim means.

15. The wheel assembly of claim 7, wherein the plurality of depressions are spaced apart around a circumferential surface of the rim means and abut the radially inner surface of the solid tire, said solid tire deforming into the depressions as a radial load is applied to it, the volume of the depressions and the shore hardness of the wear-resistant elastic composition controlling the extent of the displacement of the solid tire into the depressions and thus its radial deflection under load.

16. The wheel assembly of claim 7, wherein the means for controlling displacement of the solid tire comprise a plurality of ridges spaced apart around a circumferential surface of the rim means, said ridges abutting a radially inner surface of the solid tire and defining said plurality of depressions in an area of the rim means between said ridges, the area between the ridges and the shore hardness of the wear-resistant elastic composition controlling the extent of the displacement of the solid tire into a space defined between the ridges and thus the radial deflection of the solid tire under load.

17. The wheel assembly of claim 7, further comprising retention means for preventing the solid tire from rolling off the rim means when a lateral force is applied to the solid tire.

18. The wheel assembly of claim 17, wherein the retention means comprise a plurality of circumferentially extending cords embedded within the solid tire adjacent its sides and radially inner surface, said cords being operative to maintain hoop tension on the solid tire, preventing it from lifting off the rim means when subjected to the lateral force.

19. The wheel assembly of claim 18, wherein the cords comprise one or more selected from the group consisting of steel wire, aramid fibers, and other organic plastic fibers.

20. The wheel assembly of claim 7, wherein the solid tire has a smaller inner circumference than a portion of the rim means on which the radially inner surface of the solid tire rests when mounted so that the solid tire must be elastically stretched to mount it on the rim means.

* * * * *